(12) United States Patent  
Lee (10) Patent No.: US 9,183,778 B2  
(45) Date of Patent: Nov. 10, 2015

(54) ORGANIC LIGHT EMITTING DISPLAY AND DRIVING METHOD THEREOF

(75) Inventor: Baek-Woon Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 914 days.

(21) Appl. No.: 12/784,411

(22) Filed: May 20, 2010

(65) Prior Publication Data

US 2011/0025586 A1    Feb. 3, 2011

(30) Foreign Application Priority Data

Aug. 3, 2009 (KR) .................. 10-2009-0071279

(51) Int. Cl.  
    *G09G 3/32*     (2006.01)  
    *G09G 3/00*     (2006.01)

(52) U.S. Cl.  
    CPC .............. *G09G 3/3233* (2013.01); *G09G 3/003* (2013.01); *G09G 2300/0819* (2013.01); *G09G 2300/0852* (2013.01); *G09G 2300/0861* (2013.01); *G09G 2300/0866* (2013.01); *G09G 2310/063* (2013.01); *G09G 2320/043* (2013.01); *G09G 2340/0435* (2013.01)

(58) Field of Classification Search  
    CPC .............. G09G 3/3233; G09G 2300/0819; G09G 2310/063; G09G 2320/043; G09G 3/30; G09G 2300/0809  
    USPC ..................................................... 345/76–79  
See application file for complete search history.

(56) References Cited

U.S. PATENT DOCUMENTS

| | | |
|---|---|---|
| 5,990,629 A | 11/1999 | Yamada et al. |
| 6,229,506 B1 | 5/2001 | Dawson et al. |
| 6,380,689 B1 | 4/2002 | Okuda |
| 6,731,276 B1 | 5/2004 | Ishizuka |
| 7,944,414 B2 | 5/2011 | Shirasaki et al. |
| 7,960,917 B2 * | 6/2011 | Kimura .................. 315/169.3 |
| 8,072,396 B2 | 12/2011 | Kitazawa et al. |
| 2004/0095298 A1 | 5/2004 | Miyazawa |
| 2004/0174349 A1 | 9/2004 | Libsch et al. |

(Continued)

FOREIGN PATENT DOCUMENTS

| | | |
|---|---|---|
| CN | 1677470 A | 10/2005 |
| CN | 1766974 A | 5/2006 |

(Continued)

OTHER PUBLICATIONS

Extended European Search Report dated Nov. 2, 2010 for corresponding EP Application No. 10171400.4, (6 pages).

(Continued)

*Primary Examiner* — Amr Awad  
*Assistant Examiner* — Stephen Bray  
(74) *Attorney, Agent, or Firm* — Christie, Parker & Hale, LLP (57) ABSTRACT

An organic light emitting display is driven in a simultaneous (or concurrent) emission scheme. The organic light emitting display includes: a display unit including a plurality of pixels coupled to scan lines, control lines, and data lines; a control line driver for providing control signals to the pixels through the control lines; and a power driver for applying a power at different levels to the pixels of the display unit during a plurality of periods of one frame. The control signals and the power are concurrently provided to the pixels included in the display unit.

22 Claims, 10 Drawing Sheets

(56) References Cited

U.S. PATENT DOCUMENTS

| | | |
|---|---|---|
| 2004/0239664 A1 | 12/2004 | Hu et al. |
| 2005/0083270 A1 | 4/2005 | Miyazawa |
| 2005/0140600 A1 | 6/2005 | Kim et al. |
| 2005/0200575 A1 | 9/2005 | Kim et al. |
| 2005/0206591 A1 | 9/2005 | Wang et al. |
| 2006/0007072 A1 | 1/2006 | Choi et al. |
| 2006/0139255 A1 | 6/2006 | Kim et al. |
| 2006/0170625 A1 | 8/2006 | Kim |
| 2006/0290614 A1 | 12/2006 | Nathan et al. |
| 2007/0035534 A1 | 2/2007 | Yamazaki |
| 2007/0115225 A1* | 5/2007 | Uchino et al. ............... 345/76 |
| 2007/0273619 A1* | 11/2007 | Kitazawa et al. ............ 345/76 |
| 2007/0290954 A1 | 12/2007 | Miyazawa |
| 2008/0030436 A1* | 2/2008 | Iida et al. ................... 345/77 |
| 2008/0036706 A1 | 2/2008 | Kitazawa |
| 2008/0036710 A1 | 2/2008 | Kim |
| 2008/0049007 A1* | 2/2008 | Iida et al. ................... 345/211 |
| 2008/0074413 A1 | 3/2008 | Ogura |
| 2008/0088548 A1 | 4/2008 | Lee et al. |
| 2008/0100544 A1 | 5/2008 | Wu |
| 2008/0165095 A1* | 7/2008 | Jeon et al. ................... 345/76 |
| 2008/0252569 A1 | 10/2008 | Kwon |
| 2009/0015166 A1 | 1/2009 | Kwon |
| 2009/0051628 A1 | 2/2009 | Kwon |
| 2009/0058843 A1 | 3/2009 | Ishizuka |
| 2009/0109150 A1 | 4/2009 | Han et al. |
| 2009/0184896 A1 | 7/2009 | Kwon |
| 2009/0284519 A1* | 11/2009 | Kim et al. ................... 345/213 |
| 2009/0315977 A1 | 12/2009 | Jung et al. |
| 2010/0289883 A1* | 11/2010 | Goris et al. ................. 348/56 |
| 2012/0007842 A1 | 1/2012 | Nathan et al. |

FOREIGN PATENT DOCUMENTS

| | | |
|---|---|---|
| CN | 1881397 A | 12/2006 |
| EP | 1 418 566 A2 | 5/2004 |
| EP | 1 785 979 A2 | 5/2007 |
| JP | 61-232494 A | 10/1986 |
| JP | 2000-112428 | 4/2000 |
| JP | 2001-356738 | 12/2001 |
| JP | 2004-280059 | 10/2004 |
| JP | 2004-295131 | 10/2004 |
| JP | 2006-309258 A | 11/2006 |
| JP | 2007-47342 | 2/2007 |
| JP | 2007-148129 | 6/2007 |
| JP | 2007-155754 A | 6/2007 |
| JP | 2007-206273 | 8/2007 |
| JP | 2008-523425 | 7/2008 |
| JP | 2008-225492 | 9/2008 |
| JP | 2008-542845 | 11/2008 |
| JP | 2009-152897 A | 7/2009 |
| KR | 1020060104841 A | 10/2006 |
| KR | 100646989 B1 | 11/2006 |
| KR | 1020060112991 A | 11/2006 |
| KR | 10-0658271 B1 | 12/2006 |
| KR | 10-2007-0029997 | 3/2007 |
| KR | 10-2007-0114641 | 12/2007 |
| KR | 100839429 B1 | 6/2008 |
| KR | 10-2008-0093750 | 10/2008 |
| TW | 200630932 A | 9/2006 |
| TW | 200746782 A | 12/2007 |
| TW | 200816142 A | 4/2008 |
| TW | 200818099 A | 4/2008 |
| TW | 200820199 A | 5/2008 |
| WO | WO 2005/114629 A1 | 12/2005 |
| WO | WO 2007/021458 A1 | 2/2007 |
| WO | WO 2008/152817 A1 | 12/2008 |

OTHER PUBLICATIONS

Korean Office Action dated Mar. 8, 2011 issued by the KIPO for corresponding Application No. 10-2009-0071279, 5 pages.
SIPO Office Action dated Jun. 11, 2012 of the corresponding Chinese Patent Application No. 201010228279.0.
KIPO issued Office action dated Jul. 28, 2011 corresponding to Application No. 10-2009-0071279, 1 page.
Japanese Office action dated Aug. 7, 2012, for corresponding Japanese Patent application 2009-244710, (2 pages).
EPO Search Report dated Oct. 5, 2010 for European Patent application 10171396.4, (7 pages).
EPO Office action dated Sep. 7, 2011 for European Patent application 10171396.4, (18 pages).
KIPO Office action dated Mar. 8, 2011 for Korean Patent application 10-2009-0071279, (5 pages).
KIPO Office action dated Oct. 31, 2011 for Korean Patent application 10-2009-0071280, (2 pages).
JPO Office action dated Feb. 14, 2012 for Japanese Patent application 2009-254936, (5 pages).
SIPO Office action dated Jun. 11, 2012 for Chinese Patent application 201010214454.0, (3 pages).
Taiwan Office action dated May 21, 2013 for Taiwanese Patent application 099120347, (8 pages).
U.S. Office action dated Mar. 15, 2013, for cross reference U.S. Appl. No. 12/939,111, (12 pages).
U.S. Office action dated Jul. 15, 2013, for cross reference U.S. Appl. No. 12/786,254, (20 pages).
Taiwan Office action dated Aug. 15, 2013, with English translation, for corresponding Taiwanese Patent application 099120349, (9 pages).
SIPO Certificate of Invention Patent dated Feb. 5, 2014, for corresponding Chinese Patent Application No. 201010214454.0, with English translation of p. 1 only, (3 pages).
SIPO Certificate of Invention Patent dated Mar. 12, 2014, for corresponding Chinese Patent Application No. 201010228279.0, with English translation of p. 1 only, (3 pages).
Japanese Office action dated Jan. 24, 2012 for corresponding JP Application No. 2009-244710, 2 pages.
Taiwanese Patent Gazette dated Apr. 21, 2014, with English abstract, for corresponding Taiwanese Patent application 099120349, (2 pages).
JPO Office action dated Aug. 19, 2014, for Japanese Patent application 2009-254936, (42 pages).

* cited by examiner

ORGANIC LIGHT EMITTING DISPLAY AND DRIVING METHOD THEREOF

CROSS-REFERENCE TO RELATED APPLICATIONS

This application claims priority to and the benefit of Korean Patent Application No. 10-2009-0071279, filed on Aug. 3, 2009, in the Korean Intellectual Property Office, the entire content of which is incorporated herein by reference.

BACKGROUND

1. Field

Embodiments of the present invention relate to an organic light emitting display and a driving method thereof.

2. Description of Related Art

Recently, various flat panel displays with reduced weight and volume in comparison to a cathode ray tube have been developed. The various flat panel displays include a liquid crystal display (LCD), a field emission display (FED), a plasma display panel (PDP), an organic light emitting diode (OLED) display, etc.

Among the various flat panel displays, the organic light emitting display, which displays an image using organic light emitting diodes that emit light by re-combination of electrons and holes, has rapid response speed and low power consumption.

Generally, OLED displays can be classified as a passive matrix type OLED (PMOLED) display or an active matrix type OLED (AMOLED) display according to a method of driving the OLEDs.

The AMOLED display includes a plurality of gate lines, a plurality of data lines, a plurality of power lines, and a plurality of pixels that are coupled to the data lines and the power lines and arranged in a matrix form. Also, each of the pixels generally includes an organic light emitting (EL) device, two transistors, that is, a switching transistor that transfers a data signal and a driving transistor that drives the EL device according to the data signal, and a capacitor that maintains a data voltage corresponding to the data signal.

Such an AMOLED display has a low power consumption, but the intensity or amount of current flowing through the organic light emitting device varies according to deviation in threshold voltage among the transistors, thereby causing display non-uniformity.

In other words, since the characteristics of the transistors provided in each pixel vary according to variables in their manufacturing processes, it is difficult to manufacture the transistors so that the characteristics of all of the transistors in the AMOLED display are identical, thereby causing deviation in the threshold voltage between the transistors of different pixels.

A compensation circuit that includes a plurality of transistors and capacitors may be provided in the respective pixels. However, in this case, each pixel includes the additional plurality of transistors and capacitors of the compensation circuit.

More specifically, if the compensation circuit is added in each pixel as described above, additional transistors, capacitors and signal lines for controlling the transistors are added in each pixel so that in a bottom emission type AMOLED display, the aperture ratio is reduced and probability that defects are generated is increased due to the increased complexity in the constituents of the circuit.

Moreover, there is a recent demand for a high-speed scan driving of 120 Hz or more in order to remove the screen motion blur phenomenon. However, in this case, a charging time available for each scan line is significantly reduced. In other words, when the compensation circuit is provided in each pixel so that additional transistors are provided in each pixel coupled to one scan line, capacitive load of the scan line becomes large. Therefore, a high-speed scan driving is difficult to be implemented.

SUMMARY OF THE INVENTION

Embodiments of the present invention relate to an organic light emitting display that is driven in a simultaneous (or concurrent) emission scheme and is able to perform the threshold voltage compensation of driving transistors provided in each pixel, thereby enabling high-speed driving of the display through simple circuit.

According to an embodiment of the present invention, an organic light emitting display includes: a display unit including a plurality of pixels coupled to scan lines, control lines, and data lines; a control line driver for providing control signals to the pixels through the control lines; and a power driver for applying a power at different levels to the pixels of the display unit during a plurality of periods of one frame. The control signals and the power may be concurrently provided to the pixels included in the display unit.

The organic light emitting display may further include: a scan driver for supplying scan signals to the pixels through the scan lines; a data driver for supplying data signals to the pixels through the data lines; and a timing controller for controlling the control line driver, the power driver, the scan driver, and the data driver.

The scan signals may be applied sequentially to the scan lines for a partial period of the periods of one frame and may be applied concurrently to the scan lines during the periods other than the partial period.

Widths of the sequentially applied scan signals may be applied at two horizontal time, two adjacently applied ones of the scan signals being applied to be overlapped with each other by one horizontal time.

The data signals may be applied sequentially to the pixels by each of the scan lines corresponding to the sequentially applied scan signals and may be concurrently applied to the pixels through the data lines during the periods other than the partial period.

The power may include a first power applied to the pixels.

Each of the pixels may include: a first transistor having a gate electrode coupled to a scan line of the scan lines, a first electrode coupled to a data line of the data lines, and a second electrode coupled to a first node; a second transistor having a gate electrode coupled to the first node, a first electrode, and a second electrode; a third transistor having a gate electrode coupled to a control line of the control lines, a first electrode coupled to the second electrode of the second transistor, and a second electrode coupled to the first power; an organic light emitting diode having an anode electrode coupled to the first electrode of the second transistor and a cathode electrode coupled to a second power; and a capacitor coupled between the gate electrode of the second transistor and the first electrode of the second transistor.

The first to third transistors may be NMOS transistors.

When the first power and the control signals are applied at a high level to the pixels included in the display unit, the pixels may be configured to light-emit concurrently at brightness corresponding to the data signals pre-stored at each of the pixels.

The power may include a first power and a second power, and the first power and the second power may be applied to the pixels.

Each of the pixels may include: a first transistor having a gate electrode coupled to a scan line of the scan lines, a first electrode coupled to a data line of the data lines, and a second electrode coupled to a first node; a second transistor having a gate electrode coupled to the first node, a first electrode, and a second electrode; a third transistor having a gate electrode coupled to a control line of the control lines, a first electrode coupled to the first electrode of the second transistor, and a second electrode coupled to the second power; an organic light emitting diode having a cathode electrode coupled to the first electrode of the second transistor and an anode electrode coupled to the first power; and a capacitor coupled between the gate electrode of the second transistor and the first electrode of the second transistor.

The first to third transistors may be PMOS transistors.

Another embodiment of the present invention is directed to a driving method of an organic light emitting display. The method includes: (a) resetting data voltages applied to respective pixels by concurrently applying a first power, scan signals, control signals, and data signals, having voltage values at respective levels, to the entirety of the pixels that constitute a display unit; (b) storing a threshold voltage of a driving transistor included in the respective pixels by concurrently applying the first power, the scan signals, the control signals, and the data signals, having the voltage values at respective levels, to the entirety of the pixels; (c) applying the scan signals sequentially to the pixels coupled to scan lines of the display unit and applying the data signals to the pixels by each of the scan lines corresponding to the sequentially applied scan signals; and (d) light-emitting concurrently the entirety of the pixels at brightness corresponding to the data voltages stored in the respective pixels by concurrently applying the first power, the scan signals, the control signals, and the data signals, having the voltage values at respective levels, to the entirety of the pixels.

The driving method may further include: (e) turning off emission of the pixels by concurrently applying the first power, a second power, the control signals, and the data signals, having the voltage values at respective levels, to the entirety of the pixels and thus lowering a voltage of an anode electrode of an organic light emitting diode included in the respective pixels.

One frame may be implemented through (a) to (d).

The one frame may be a progressively progressed frame and may include an nth frame for displaying a left-eye image and an n+1st frame for displaying a right-eye image.

An entire time between an emission period of the nth frame and an emission period of the n+1st frame may be synchronized with a response time of a shutter glasses.

Each of the pixels may include: a first NMOS transistor having a gate electrode coupled to a scan line, a first electrode coupled to a data line, and a second electrode coupled to a first node; a second NMOS transistor having a gate electrode coupled to the first node, a first electrode, and a second electrode; a third NMOS transistor having a gate electrode coupled to a control line, a first electrode coupled to the first electrode of the second NMOS transistor, and a second electrode coupled to the first power; an organic light emitting diode having an anode electrode coupled to the first electrode of the second NMOS transistor and a cathode electrode coupled to a second power; and a capacitor coupled between the gate electrode of the second NMOS transistor and the first electrode of the second NMOS transistor.

In (a), the first power may be applied at a low level, the scan signal may be applied at a high level, and the control signal may be applied at a high level.

In (b), the first power may be applied at a high level, and the scan signal and the control signal may be applied at a high level, respectively.

In (c), the control signal may be applied at a low level. In (c), widths of the sequentially applied scan signals may be applied at two horizontal time, adjacently applied ones of the scan signals being applied to be overlapped with each other by one horizontal time.

In (d), the first power may be applied at a high level, the scan signal may be applied at a low level, and the control signal may be applied at a high level.

With the embodiments as described above, the pixel circuit provided in the respective pixels of the organic light emitting display includes three transistors and one capacitor, and the pixels are driven in the simultaneous (or concurrent) emission scheme. Thereby, the threshold voltage compensation and the high-speed driving of the driving transistor provided in the respective pixels can be performed with a simple circuit.

Moreover, the embodiments enable improved three dimension (3D) display performance through the simultaneous (or concurrent) emission scheme as described in the embodiments.

BRIEF DESCRIPTION OF THE DRAWINGS

The accompanying drawings, together with the specification illustrate exemplary embodiments of the present invention, and, together with the description, serve to explain the principles of the present invention.

DETAILED DESCRIPTION

Hereinafter, certain exemplary embodiments according to the present invention will be described with reference to the accompanying drawings. Here, when a first element is described as being coupled to a second element, the first element may be directly coupled to the second element, or may be indirectly coupled to the second element via a third element. Further, some of the elements that are not essential to a complete understanding of the invention are omitted for clarity. Also, like reference numerals refer to like elements throughout.

Hereinafter, exemplary embodiments according to the present invention will be described with reference to the accompanying drawings.

Figure 1:
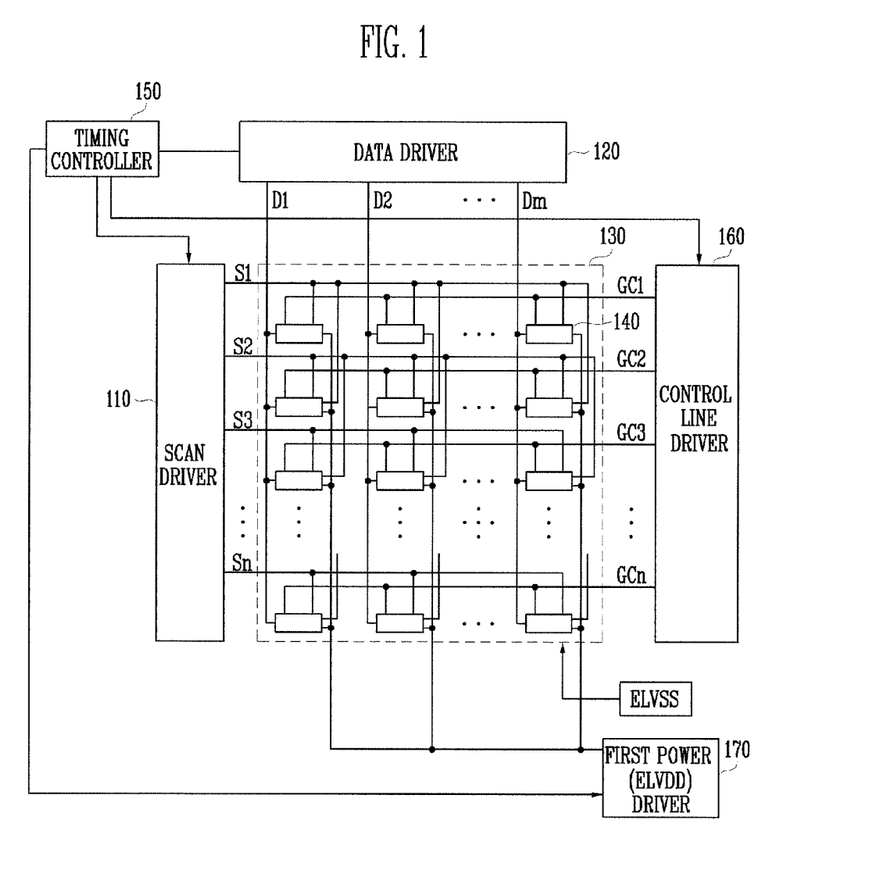
FIG. 1 is a block diagram of an organic light emitting display according to an embodiment of the present invention.
Figure 2:
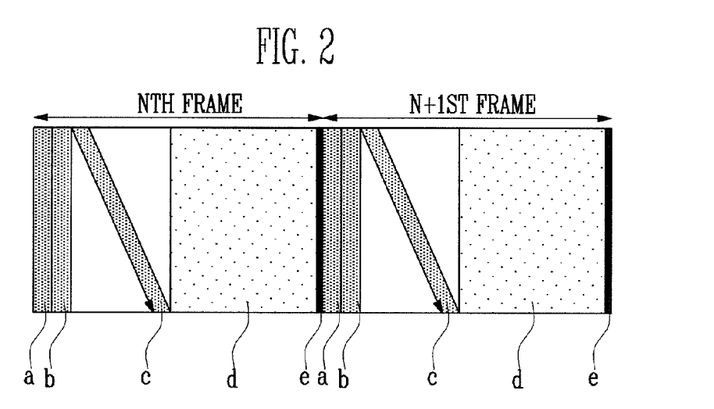
FIG. 2 is a diagram showing a driving operation in a simultaneous (or concurrent) emission scheme according to an embodiment of the present invention.

FIG. 1 is a block diagram of an organic light emitting display according to an embodiment of the present invention, and FIG. 2 is a diagram showing a driving operation in a simultaneous (or concurrent) emission scheme according to an embodiment of the present invention.

Referring to FIG. 1, the organic light emitting display according to one embodiment of the present invention includes a display unit 130 that includes pixels 140 that are coupled to scan lines S1 to Sn, control lines GC1 to GCn and data lines D1 to Dm, a scan driver 110 that provides scan signals to the pixels 140 through the scan lines S1 to Sn, a control line driver 160 that provides control signals to the pixels 140 through the control lines GC1 to GCn, a data driver 120 that provides data signals to the pixels 140 through the data lines D1 to Dm, and a timing controller 150 that controls the scan driver 110, the data driver 120, and the control line driver 160.

In addition, the pixels 140 of the display unit 130 are positioned on regions defined by the crossings of the scan lines S1 to Sn and the data lines D1 to Dm. The pixels 140 receive a first power ELVDD and a second power ELVSS from the outside. Each of the pixels 140 controls the amount of current supplied to the second power ELVSS from the first power ELVDD through an OLED included in each pixel corresponding to the data signals. Then, light having a brightness (e.g., a predetermined brightness) corresponding to the data signals is generated in the OLED.

In the embodiment of FIG. 1, the first power ELVDD applied to the pixels 140 of the display unit 130 has voltage values at different levels during one frame. To this end, a first power ELVDD driver 170 that controls the supply of the first power ELVDD is provided, and the first power ELVDD driver 170 is controlled by the timing controller 150.

Moreover, in the embodiment of FIG. 1, the organic light emitting display is driven in a simultaneous (or concurrent) emission scheme rather than in a progressive emission scheme. As shown in FIG. 2, this means that data is input in sequence during the period of one frame, and after the input of the data is completed, light emission of the pixels 140 in accordance with the data of one frame is performed throughout the display unit 130, including all of the pixels 140.

In the progressive emission scheme according to the related art, the emission is performed in sequence right after data is input in sequence per scan line. However, in the embodiment of FIG. 1, the input of the data is performed in sequence, but the emission is collectively or concurrently performed on the entire display unit 130 after the input of the data is completed.

Referring to FIG. 2, the driving steps according to an embodiment of the present invention is divided into (a) a reset step, (b) a threshold voltage compensation step, (c) a scanning step (a data input step), and (d) an emission step. Herein, (c) the scanning step (the data input step) is performed in sequence per the respective scan lines, but (a) the reset step, (b) the threshold voltage compensation step, and (d) the emission step are each performed collectively and simultaneously or concurrently on the entirety of the display unit 130.

Further, (e) an emission turn-off step may also be included after (d) the emission step.

Here, (a) the reset step, which is a step where the data voltage applied to each pixel 140 of the display unit 130 is reset, is a period where the voltage of the anode electrode of the organic light emitting diode is dropped below the voltage of the cathode electrode so that the organic light emitting diode is not light-emitted.

Further, (b) the threshold voltage compensation step is a period where the threshold voltage of the driving transistor provided in each pixel 140 is compensated for.

Therefore, the signals applied during (a) the reset step, (b) the threshold voltage compensation step, (d) the emission step, and (e) the emission turn-off step, that is, the scan signals applied to the respective scan lines S1 to Sn, the first power ELVDD applied to the respective pixels 140, and the control signals applied to the respective control lines GC1 to GCn, are collectively and simultaneously (or concurrently) applied to the pixels 140 provided in the display unit 130 at corresponding voltage levels (e.g., predetermined voltage levels), respectively.

In the "simultaneous (or concurrent) emission scheme" according to the embodiment of the present invention, the respective operation periods ((a) to (e) steps) are clearly divided in time. Therefore, the number of the transistors of the compensation circuit provided in the respective pixels 140 and the number of the signal lines that control thereof can be reduced, such that the pair of shutter glasses for 3D display can be easily implemented.

When a user wears the "pair of shutter glasses" that switches transmittance of left eye and right eye between 0% and 100% and sees a screen displayed on an image display, that is, on the display unit of the organic light emitting display, the screen is displayed to the user as a left-eye image and a right-eye image for each frame. As such, the user sees the left-eye image with only his or her left eye and the right-eye image with only his or her right eye, thereby experiencing three-dimensional effects.

Figure 3:
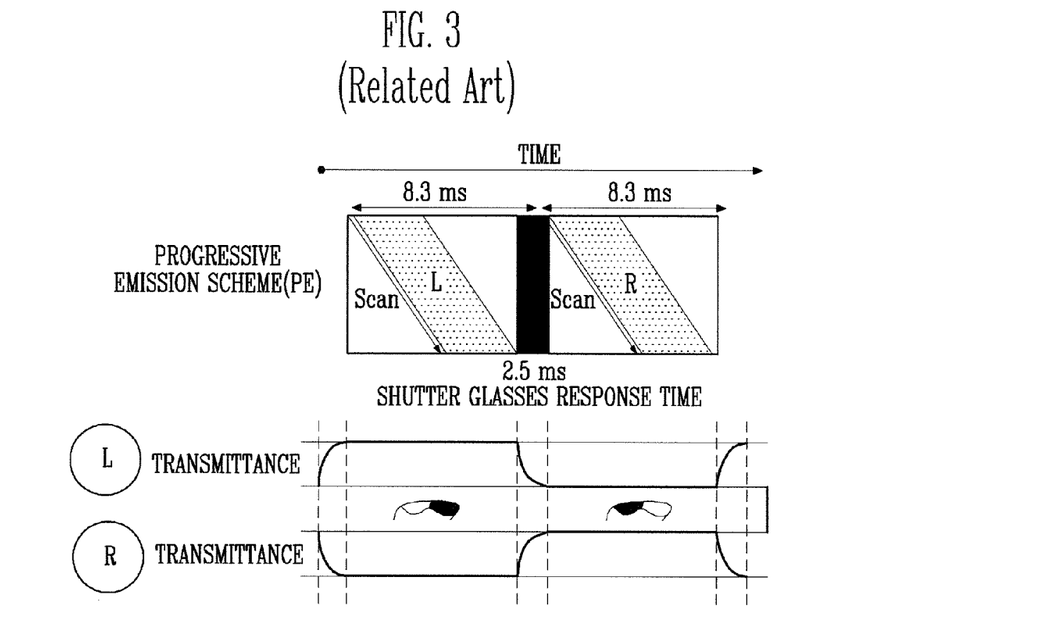
FIG. 3 is a diagram showing an example where a pair of shutter glasses for 3D display is implemented in a progressive emission scheme according to a related art.
Figure 4:
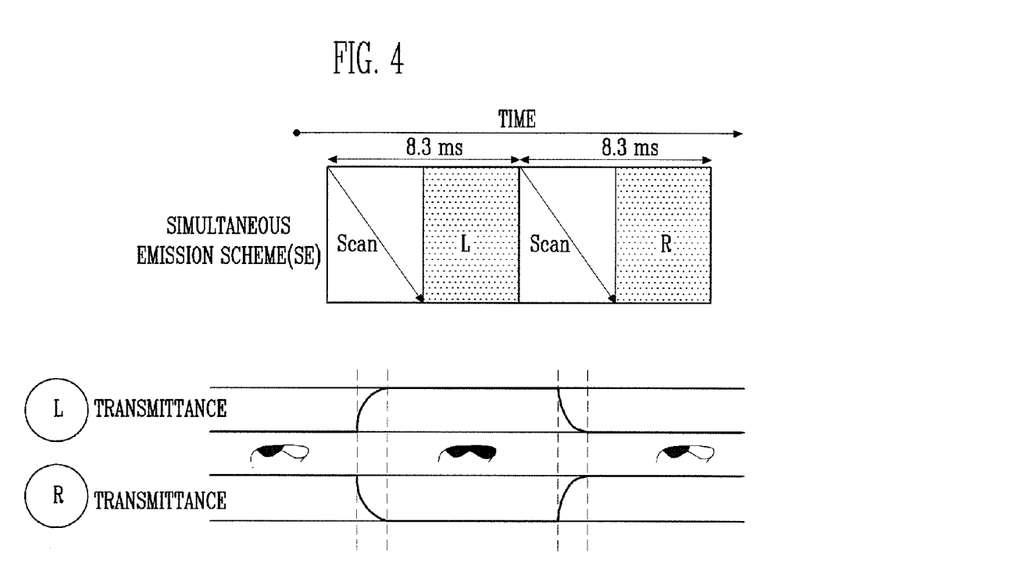
FIG. 4 is a diagram showing an example where a pair of shutter glasses for 3D display is implemented in a simultaneous (or concurrent) emission scheme according to an embodiment of the present invention.

FIG. 3 is a diagram showing an example where a pair of shutter glasses for 3D display is implemented in a progressive emission scheme according to a related art, and FIG. 4 is a diagram showing an example where a pair of shutter glasses for 3D display is implemented in a simultaneous (or concurrent) emission scheme according to an embodiment of the present invention.

Figure 5:
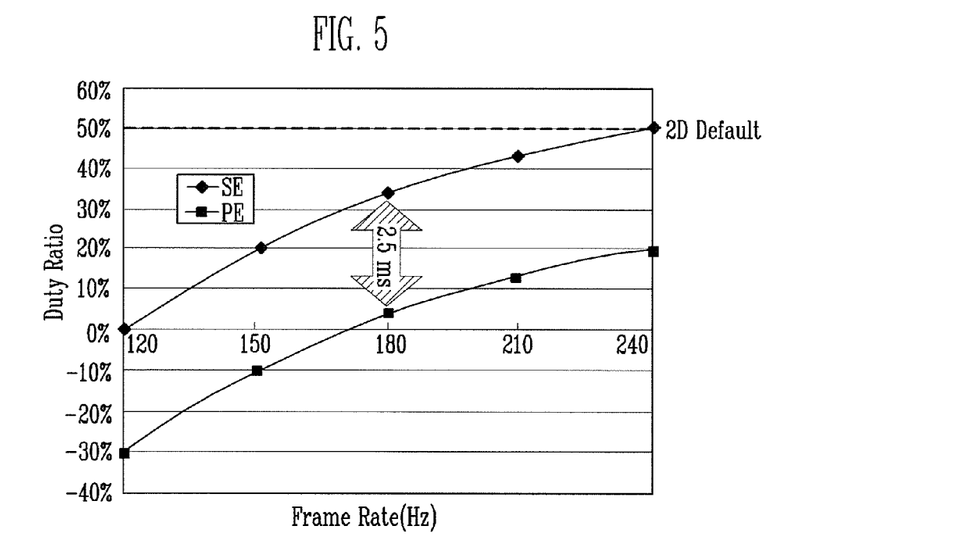
FIG. 5 is a graph comparing the duty ratios that can be obtained in the simultaneous (or concurrent) emission scheme and the progressive emission scheme.

FIG. 5 is a graph comparing the duty ratio that can be obtained in the cases of the simultaneous (or concurrent) emission scheme and the progressive emission scheme.

When the screen is displayed in the progressive emission scheme according to the related art as aforementioned in the case of implementing such a pair of shutter glasses for 3D display, as shown in FIG. 3, the response time (for example, 2.5 ms) of the pair of shutter glasses is finite (e.g., non-zero) so that the emission should be turned off during the response time in order to prevent a cross talk phenomenon between the left-eye/right-eye images.

In other words, a non-light emitting period during the response time is additionally generated between a frame ($n^{th}$ frame) where the left-eye image is output and a frame ($n+1^{st}$ frame) where the right-eye image is output. Therefore, the duty ratio of the emission time becomes lower.

In the "simultaneous (or concurrent) emission scheme" according to one embodiment of the present invention, referring to FIG. 4, the light-emitting step is collectively and simultaneously (or concurrently) performed on the entire display unit as aforementioned, and the non-emission period is performed during the periods other than the light-emitting step so that the non-emission period is between the period where the left-eye image is output and the period where the right-eye image is output.

In other words, the emission turn-off period, the reset period, and the threshold voltage compensation period, which are the periods between the emission period of the $n^{th}$ frame and the emission period of the $n+1^{st}$ frame, are non-light emitted so that if the entire time of the above periods are synchronized with the response time (for example, 2.5 ms) of the pair of shutter glasses, there is no need to reduce the duty ratio of the emission time unlike in the progressive emission scheme according to the related art.

Therefore, when implementing the pair of shutter glasses for 3D display, the "simultaneous (or concurrent) emission scheme" can improve the duty ratio by the response time of the pair of shutter glasses as compared to the "progressive emission scheme" according to the related art, making it possible to improve performance. This is illustrated in the graph of FIG. 5.

Figure 6:
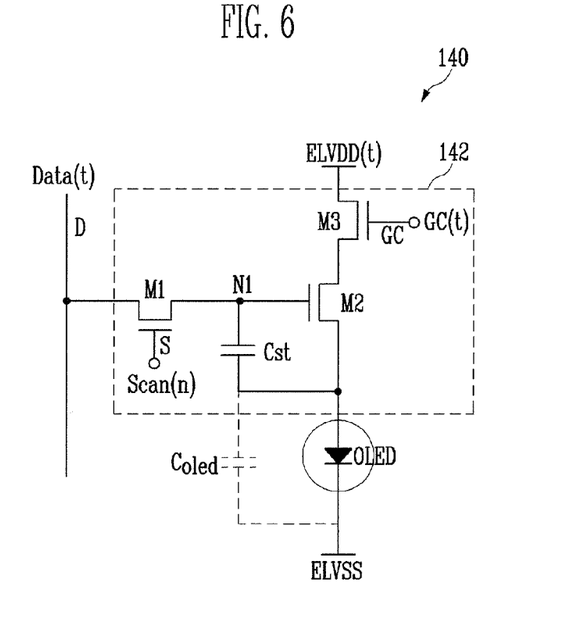
FIG. 6 is a circuit view showing a circuit schematic according to one embodiment of a pixel in FIG. 1.
Figure 7:
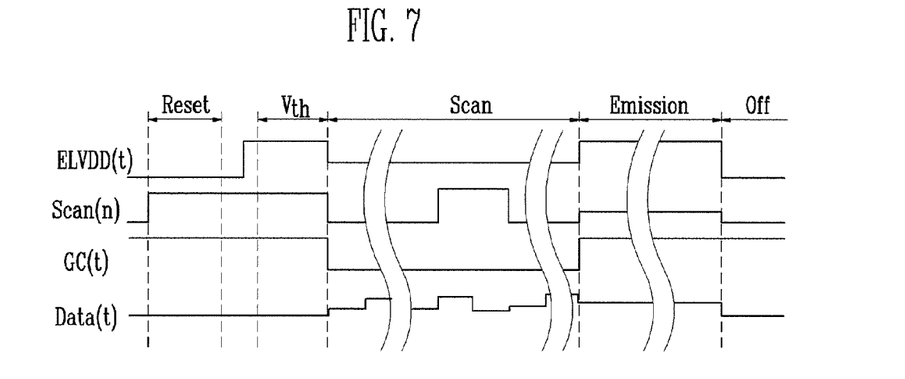
FIG. 7 is a driving timing diagram of the pixel in FIG. 6.

FIG. 6 is a circuit diagram of the pixel 140 in FIG. 1 according to one embodiment of the present invention, and FIG. 7 is a driving timing diagram of the pixel 140 in FIG. 6.

Referring to FIG. 6, the pixel 140 according to one embodiment of the present invention includes an OLED and a pixel circuit 142 that supplies current to the diode OLED.

The anode electrode of the OLED is coupled to the pixel circuit 142, and the cathode electrode thereof is coupled to a second power ELVSS. The OLED generates light having a brightness (e.g., a predetermined brightness) corresponding to the current supplied from the pixel circuit 142.

In the embodiment of FIG. 1, the pixels 140 that constitute the display unit 130 receive data signals supplied to the data lines D1 to Dm when scan signals are supplied sequentially to the scan lines S1 to Sn for a partial period (the aforementioned (c) step) of one frame. However, the scan signals applied to the scan lines S1 to Sn, the first power ELVDD applied to the pixels 140, and the control signals applied to the control lines GC1 to GCn, having predetermined voltage levels, are collectively and simultaneously (or concurrently) applied to the pixels 140, during other periods (e.g., (a), (b), (d), and (e) steps) of one frame.

In one embodiment of the present invention, the pixel circuit 142 provided in the respective pixels 140 includes three transistors M1 to M3 and one capacitor Cst.

Moreover, in one embodiment of the present invention, in consideration of the capacitance of a parasitic capacitor Coled generated by the anode electrode and the cathode electrode of the OLED, the coupling effect of the capacitor Cst and the parasitic capacitor Coled is utilized. This will be described in more detail with reference to FIGS. 8A-8E.

Here, the gate electrode of the first transistor M1 is coupled to a scan line S, and the first electrode of the first transistor M1 is coupled to a data line D. The second electrode of the first transistor M1 is coupled to a first node N1.

Here, a scan signal Scan(n) is applied to the gate electrode of the first transistor M1, and a data signal Data(t) is applied to the first electrode of the first transistor M1.

The gate electrode of the second transistor M2 is coupled to the first node N1, and the first electrode of the second transistor M2 is coupled to the anode electrode of the OLED. The second electrode of the second transistor M2 is coupled to a first power ELVDD(t) through the first and second electrodes of the third transistor M3. The second transistor M2 serves as a driving transistor.

The gate electrode of the third transistor M3 is coupled to a control line GC, the first electrode of the third transistor M3 is coupled to the second electrode of the second transistor M2, and the second electrode of the third transistor M3 is coupled to the first power ELVDD(t).

Here, a control signal GC(t) is applied to the gate electrode of the third transistor M3, and the first power ELVDD(t) that is varied to a voltage level (e.g., a predetermined level) is input into the second electrode of the third transistor M3.

In addition, the cathode electrode of the OLED is coupled to a second power ELVSS(t), and the capacitor Cst is coupled between the gate electrode of the second transistor M2, at the first node, and the first electrode of the second transistor M2, coupled to the anode electrode of the OLED.

In the embodiment shown in FIG. 6, all of the first to third transistors M1 to M3 are implemented as NMOS transistors, however, the present invention is not limited as such.

As described above, the pixels 140 according to the embodiment of the present invention are driven in the "simultaneous (or concurrent) emission scheme."

Referring to FIG. 7, the driving of the pixels 140 is divided into a reset period Reset, a threshold voltage compensation period Vth, a scan/data input period Scan, an emission period Emission, and an emission turn-off period Off for each frame, as shown in FIG. 7.

Here, the scan signals are input sequentially scan line by scan line, and the data signals are input sequentially into the pixels corresponding thereto for the scan/data input period Scan. However, the signals having voltage values at respective levels (e.g., predetermined levels), that is, the first power ELVDD(t), the scan signal Scan(n), the control signal GC(t), the data signal Data(t), are collectively applied to all of the pixels 140 that constitute the display unit 130 for periods other than the scan/data input period Scan.

In other words, the threshold voltage compensation of the driving transistor provided in the respective pixels 140 and the emission operations of the respective pixels 140 are simultaneously (or concurrently) implemented in all of the pixels 140 of the display unit 130 for each frame.

Hereinafter, the driving in the simultaneous (or concurrent) emission scheme according to one embodiment of the present invention will be described in more detail with reference to FIGS. 8A to 8E.

FIGS. 8A to 8E are circuit diagrams and waveform diagrams for explaining the driving of an organic light emitting display according to an embodiment of the present invention.

For the convenience of explanation, although the voltage levels of the input signals are described using concrete numerical values, these are exemplary values for facilitating understanding but are not actual design values.

Moreover, in the embodiment of FIGS. 8A to 8E, it is assumed that the capacitance of the capacitor Cst is ⅕ of the capacitance of the parasitic capacitor Coled of the organic light emitting diode.

Figure 8A:
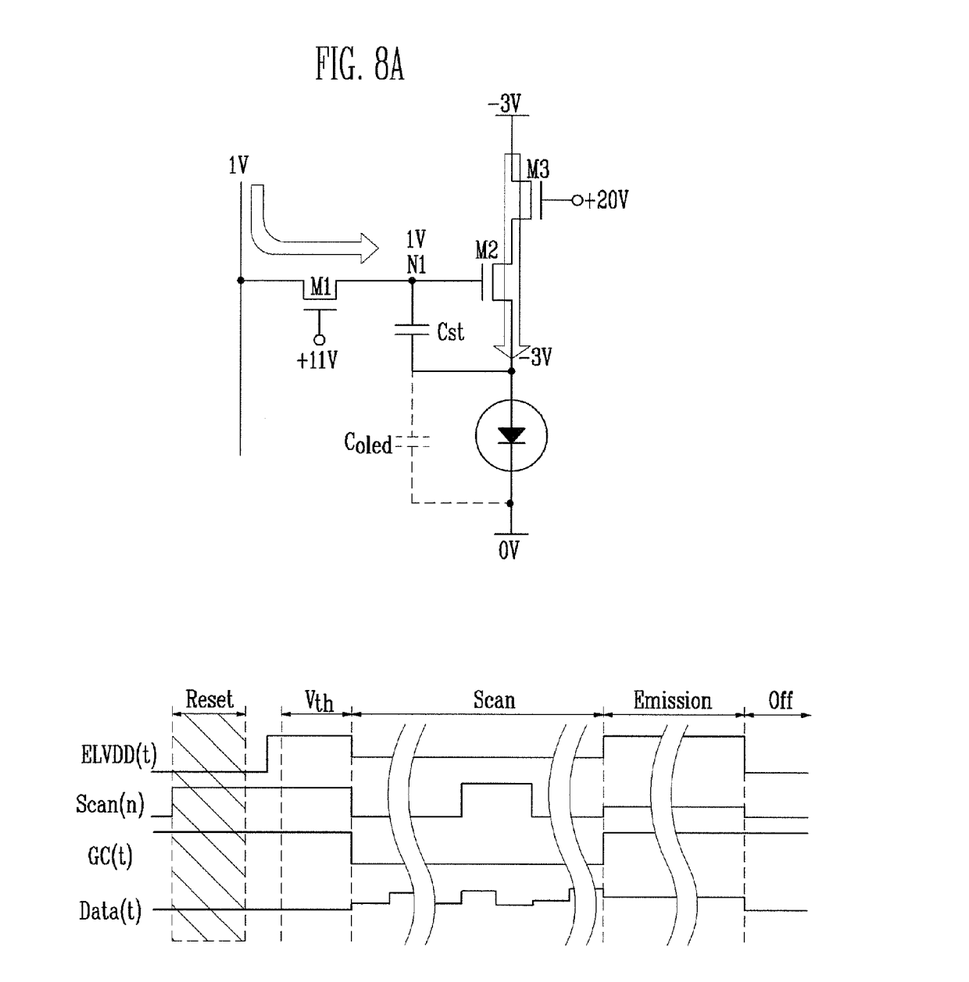
FIGS. 8A, 8B, 8C, 8D and 8E are circuit diagrams and waveform diagrams for explaining the driving of an organic light emitting display according to an embodiment of the present invention.

First, referring to FIG. 8A, a Reset period is illustrated. In the Reset period, the data voltage applied to the respective pixels 140 of the display unit 130 is reset, wherein the voltage of the anode electrode of the OLED is dropped below the voltage of the cathode electrode of the OLED in order that the OLED is not light-emitted.

In other words, during the Reset period, the first power ELVDD(t) is applied at a low level (for example, −3V), the scan signal Scan(n) is applied at a high level (for example, 11V), and the control signal GC(t) is applied at a high level (for example, 20V).

Moreover, when the threshold voltage of the second transistor M2, which is a driving transistor, is stored, the data signal Data(t) is applied with a voltage value corresponding to the magnitude of the threshold voltage of the second transistor M2 so that the voltage at the anode electrode of the OLED, which is coupled to the first electrode of the second transistor M2, becomes about 0V.

In one embodiment, for the convenience of explanation, assuming that the threshold voltage of the second transistor M2 is 1V, the data signal Data(t) applied during the Reset period becomes 1V, as shown in FIG. 8A.

Further, the reset step in the Reset period is collectively applied to all of the pixels 140 that constitute the display unit 130 so that the signals applied during the reset step, that is, the first power ELVDD(t), the scan signal Scan(n), the control signal GC(t), and the data signal Data(t), are applied simultaneously or concurrently to all of the pixels 140, the signals having their voltage values set at respective levels.

According to the application of the signals as described above, the first transistor M1, the second transistor M2, and the third transistor M3 are turned on.

Therefore, the voltage at 1V corresponding to the threshold voltage of the second transistor M2 is applied as the data signal to the first node N1, and a current path is formed from the first power ELVDD(t) to the anode electrode of the OLED as the second and third transistors M2 and M3 are turned on so that the voltage value at the anode electrode is dropped to −3V, which is the voltage value of the first power ELVDD(t).

Figure 8B:
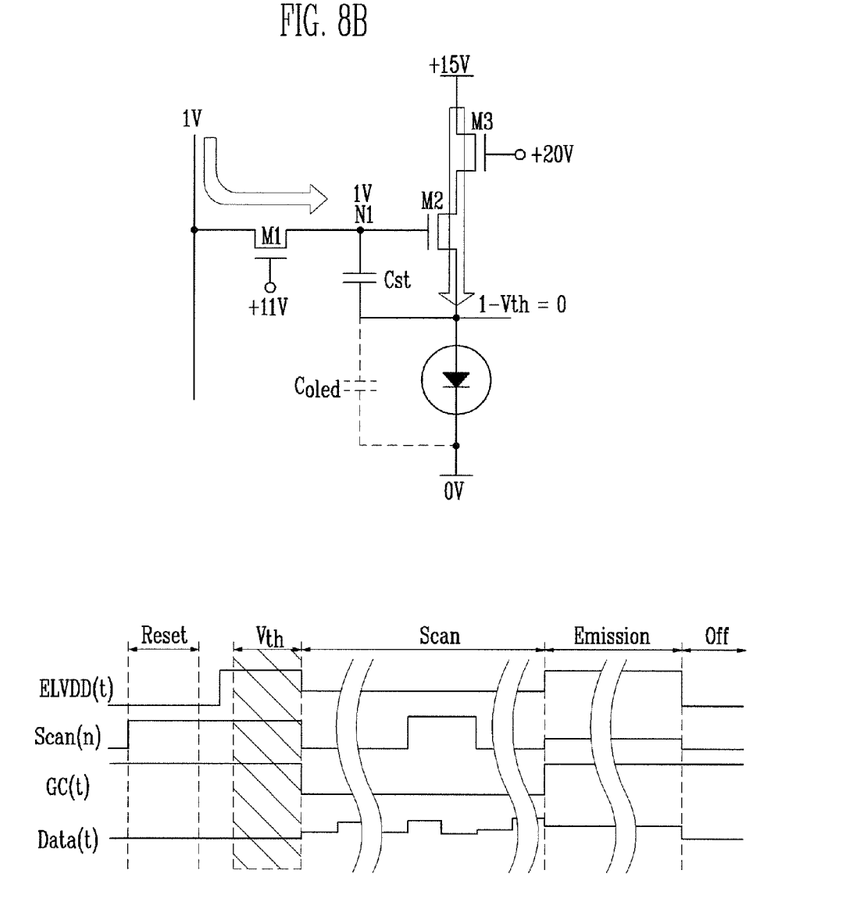

Next, referring to FIG. 8B, a period, where the threshold voltage of the driving transistor M2 provided in the pixels 140 of the display unit 130 is stored in the capacitor Cst, is illustrated. In this embodiment, the defects due to the deviation in the threshold voltage of the driving transistor M2, when data voltage is charged in the pixels 140, is compensated for.

In other words, during the threshold voltage compensation period Vth, the first power ELVDD(t) is applied at a high level (for example, 15V), the scan signal Scan(n) and the control signal GC(t) are applied at a high level (for example, 11V and 20V), respectively, in the same manner as the Reset period, and the data signal Data(t) also maintains the same voltage value (for example, 1V) as that in the previous Reset period.

Moreover, in the threshold voltage compensation period Vth is also collectively applied to the pixels 140 that constitute the display unit 130. Therefore, the signals applied during the threshold voltage compensation period Vth, including the first power ELVDD(t), the scan signal Scan(n), the control signal GC(t), and the data signal Data(t), are applied simultaneously or concurrently to all of the pixels 140, at respective voltage values.

According to the application of the signals as described above, the first transistor M1, the second transistor M2, and the third transistor M3 are turned on.

However, in the case of the second transistor M2, it is turned on until the voltage difference Vgs between the gate electrode and the first electrode corresponds to the threshold voltage of the second transistor M2, and thereafter, it is turned off.

In other words, the voltage of the anode electrode of the organic light emitting diode, which is dropped to −3V during the original Reset step when a current path is formed between the first power ELVDD(t) and the anode electrode as the second and third transistors M2 and M3 are turned on, is raised to a voltage (0V in the embodiment of FIG. 8B) that is equal to the voltage (for example, 1V) of the gate electrode of the second transistor M2—the threshold voltage (for example, 1V) of the second transistor M2.

Therefore, the first electrode of the capacitor Cst coupled to the first node N1 is at 1V, and the second electrode of the capacitor Cst coupled to the anode electrode of the OLED is at 0V, such that the voltage stored in the capacitor Cst becomes 1V, that is, the voltage corresponding to the threshold voltage of the second transistor M2.

Figure 8C:
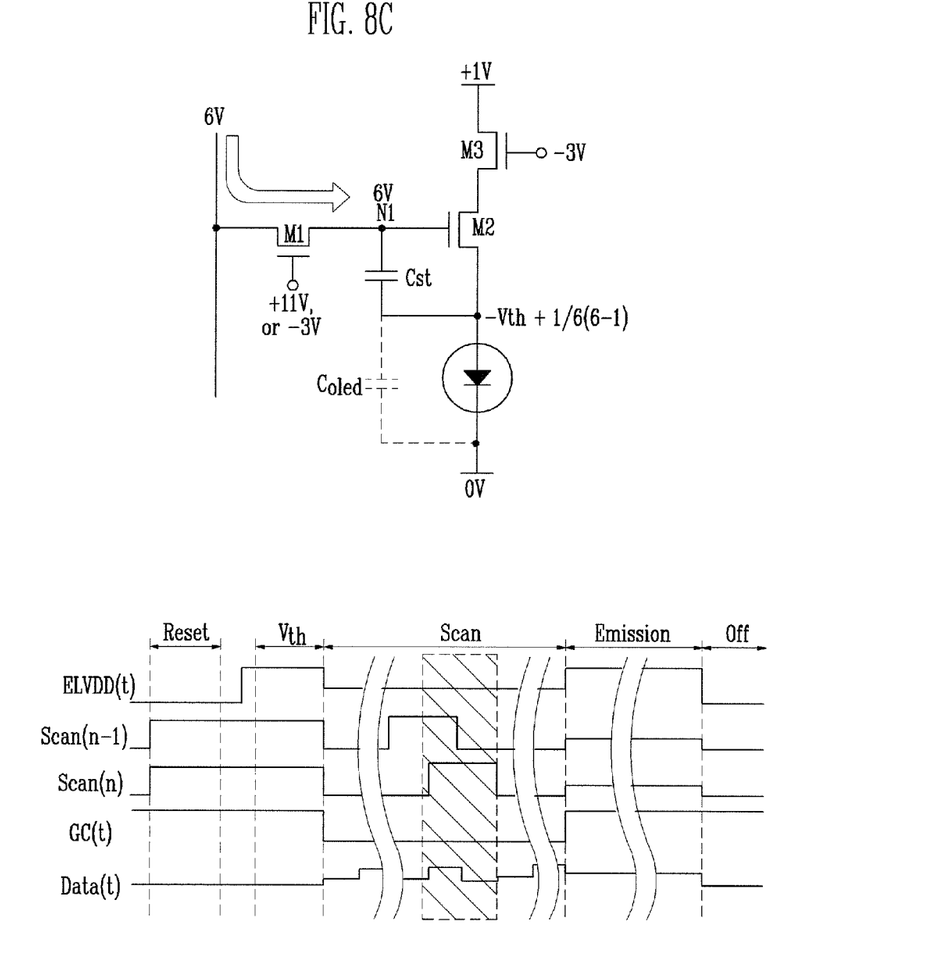

Next, referring to FIG. 8C, a scan/data input period Scan is illustrated. In the scan/data input period Scan, the scan signals are applied sequentially to the pixels 140, the pixels 140 being coupled to the scan lines S1 to Sn, so that the data signals supplied to the data lines D1 to Dm are applied to the pixels 140.

In other words, in the scan/data input period Scan of FIG. 8C, the scan signals are input sequentially to the scan lines S1 to Sn, the data signals corresponding thereto are input sequentially to the pixels 140 coupled to the respective scan lines S1 to Sn, and the control signal GC(t) is applied at a low level (for example, −3V) during the period.

However, in one embodiment of the present invention, the widths of the sequentially applied scan signals are exemplarily applied at two horizontal time 2H, as shown in FIG. 8C. In other words, the width of the n−1$^{st}$ scan signal Scan(n−1) and the width of the nth scan signal Scan(n) applied following thereof are applied to be overlapped by 1H.

The overlapping addresses the charge shortage phenomenon according to the RC delay of the signal lines due to the large size of the display unit 130.

Moreover, as the control signal GC(t) is applied at a low level, the third transistor M3 that is an NMOS transistor in FIG. 8C is turned off so that the first power ELVDD(t) may be provided at any levels for the period.

In the case of the pixel shown in FIG. 8C, if the scan signal Scan(n) at a high level is applied so that the first transistor M1 is turned on, the data signal Data(t) having a voltage value (e.g., a predetermined voltage value) is applied to the first node N1 via the first and second electrodes of the first transistor M1.

Here, assuming that the voltage value of the applied data signal Data(t) is 6V, the voltage of the first node N1 is raised from the previous 1V to 6V so that the voltage at the anode electrode becomes $$-Vth + \frac{Cst}{Cst + Coled}(\text{Data} - 1) = -1 + 1/6(6-1)$$

due to the coupling effects between the capacitor Cst and the parasitic capacitor Coled of the organic light emitting diode. Herein, it is assumed that the capacitance of Cst is ⅕ of the capacitance of Coled.

Consequently, the voltage having a value that reflects the threshold voltage of the second transistor M2 is applied to the anode electrode of the organic light emitting diode, that is, the first electrode of the second transistor M2.

However, since the third transistor M3 is not turned on during the scan/data input period, a current path is not formed between the organic light emitting diode and the first power ELVDD(t) so that current is not substantially supplied to the OLED. That is, an emission is not performed.

Figure 8D:
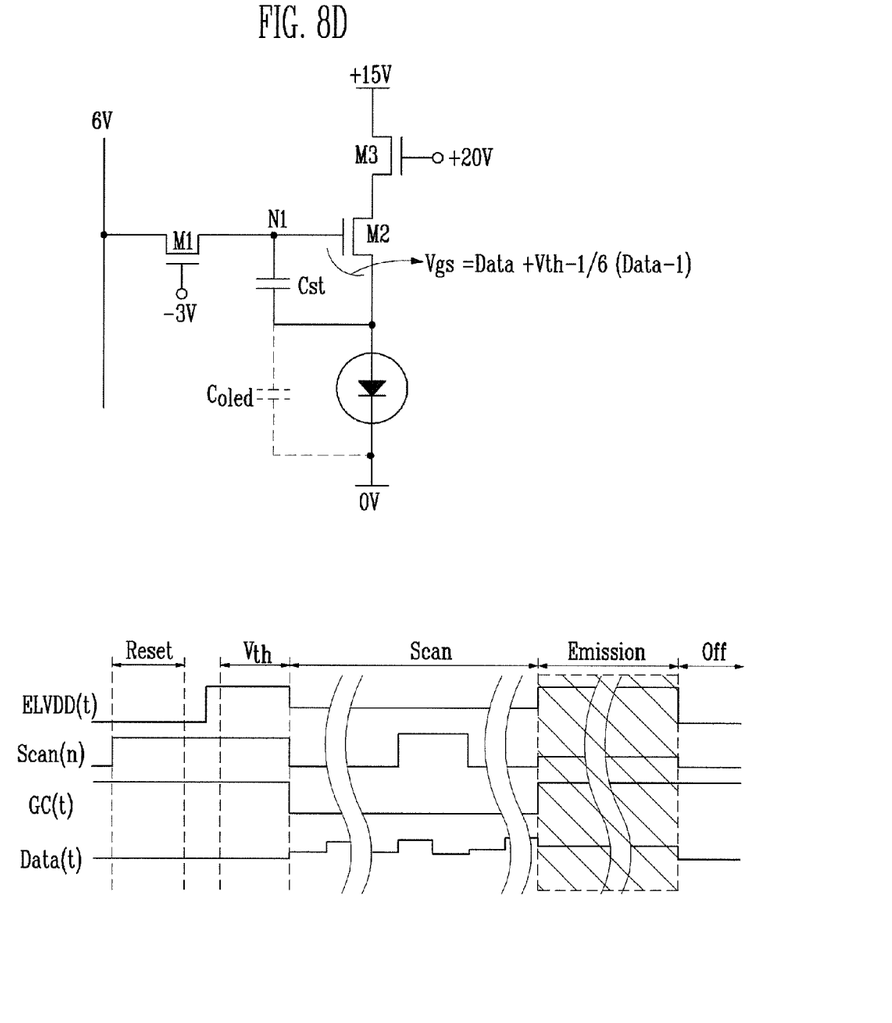

Next, referring to FIG. 8D, an Emission period is illustrated. In the Emission period, a current corresponding to the data voltage stored in each of the pixels 140 of the display unit 130 is supplied to the OLED provided in each of the pixels 140 so that the emission is performed.

In other words, during the Emission period, the first power ELVDD(t) is applied at a high level (for example, 15V), the scan signal Scan(n) is applied at a low level (for example, −3V), and the control signal GC(t) is applied at a high level (for example, 20V).

Here, as the scan signal Scan(n) is applied at a low level, the first transistor M1 that is an NMOS transistor in FIG. 8D is turned off so that the data signal may be supplied at any levels for the period.

Moreover, the emission step of the Emission period is also collectively applied to the pixels 140 that constitute the display unit 130. Therefore, the signals applied during the emission step, that is, the first power ELVDD(t), the scan signal Scan(n), the control signal GC(t), and the data signal Data(t), are simultaneously or concurrently applied to all of the pixels 140, the signals having their voltage values set at respective levels.

According to the application of the signals as described above, the first transistor M1 is turned off, and the second transistor M2 and the third transistor M3 are turned on.

As the second transistor M2 and the third transistor M3 are turned on as described above, a current path is formed between the first power ELVDD(t) and the cathode electrode of the OLED. Therefore, a current corresponding to a Vgs voltage value of the second transistor M2, that is, the voltage corresponding to the voltage difference between the gate electrode and the first electrode of the second transistor M2, is applied to the organic light emitting diode so that it is light-emitted at brightness corresponding thereto.

Here, in one embodiment of the present invention, the voltage Vgs becomes $$\text{Data} + Vth - \frac{Cst}{Cst + Coled}(\text{Data} - 1),$$

and
the current flowing to the OLED corresponding to the voltage Vgs is represented by $$\text{Ioled} = \beta/2(\text{Vgs} - Vth)^2$$

so that in the embodiment as illustrated in FIG. 8D, the current flowing to the organic light emitting diode is represented as:

$$\text{Ioled} = \frac{\beta}{2}\left(\text{Data} + Vth - \frac{Cst}{Cst + Coled}(\text{Data} - 1) - Vth\right) = \frac{\beta}{2}\left(\text{Data} - \frac{Cst}{Cst + Coled}(\text{Data} - 1)\right)$$

This current addresses the problem generated by the deviation in the threshold voltage of the second transistor M2.

Figure 8E:
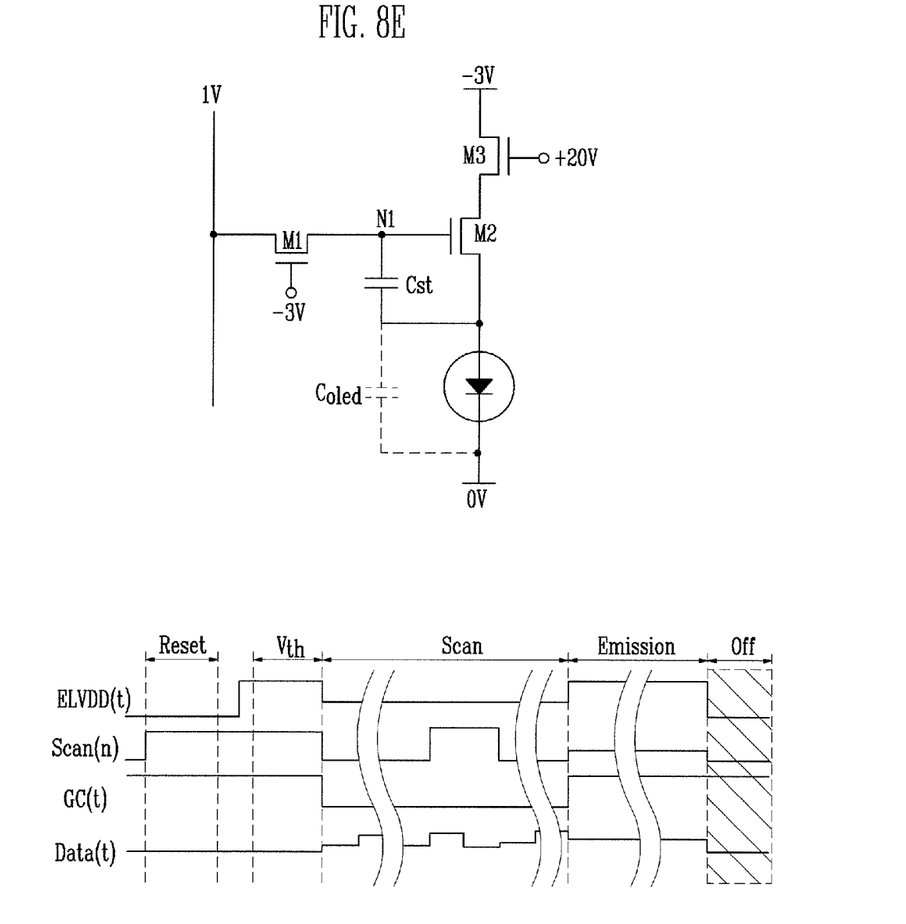

After the emission is performed on all of the pixels 140 of the display unit 130 as described above, an emission turn-off step is performed as shown in FIG. 8E.

In other words, referring to FIG. 8E, during the emission turn-off period, the first power ELVDD(t) is applied at a low level (for example, −3V), the scan signal Scan(n) is applied at a low level (for example, −3V), and the control signal CG(t) is applied at a high level (for example, 20V).

In other words, compared with the Emission period of FIG. 8D, the emission turn-off period Off is the same except that the first power ELVDD(t) is changed from the high level to the low level (for example, −3V).

In this case, a current path is formed between the anode electrode of the organic light emitting diode and the first power ELVDD(t) as the second and third transistors M2 and M3 are turned on. Therefore, the voltage at the anode electrode is gradually dropped to −3V that is the voltage value at the first power ELVDD(t), and consequently, the voltage of the anode electrode is dropped below that of the cathode electrode so that the emission is turned off.

As described above, one frame is implemented through the periods shown in FIGS. 8A to 8E, and the periods are continuously repeated, thereby implementing the following frames. In other words, after the emission turn-off period of FIG. 8E, the reset period of FIG. 8A begins again.

Figure 9:
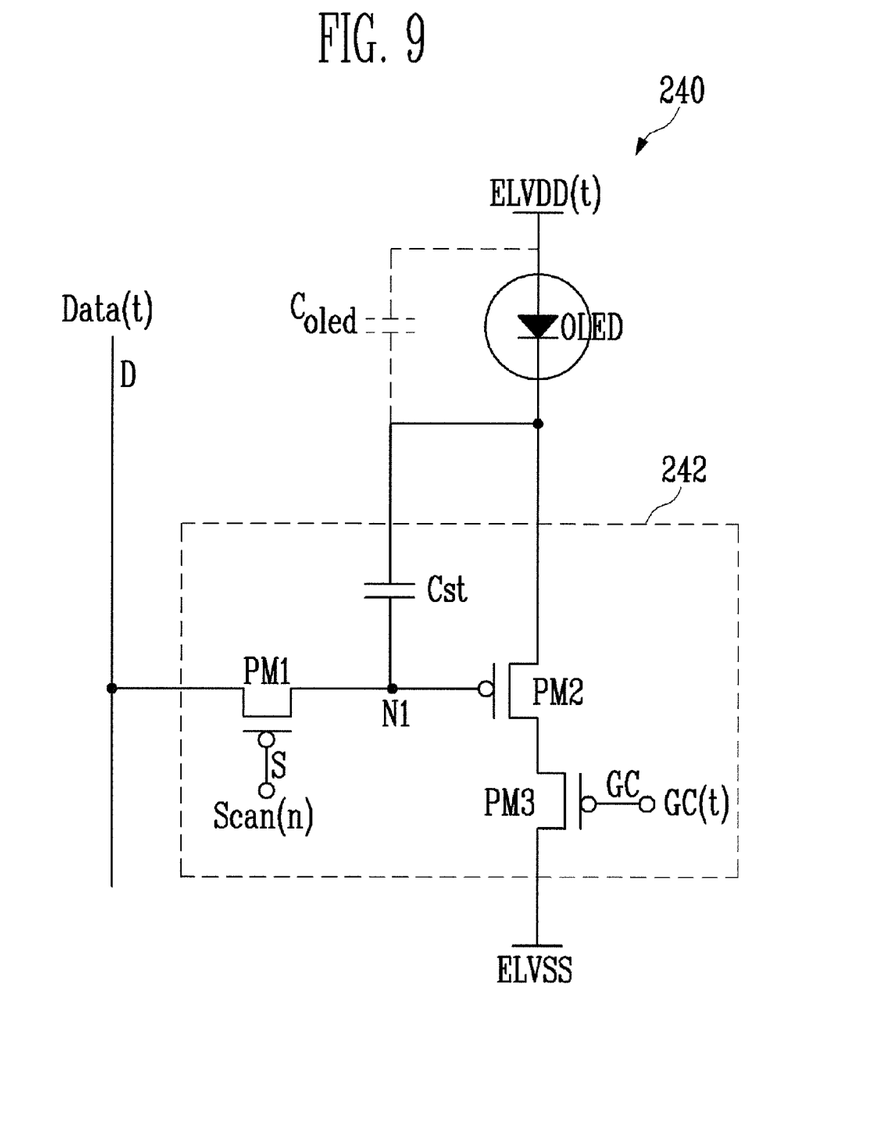
FIG. 9 is a circuit diagram according to another embodiment of the pixel in FIG. 1.

FIG. 9 is a circuit diagram showing a pixel 240 according to another embodiment of the present invention.

Referring to FIG. 9, compared with the embodiment of FIG. 6, it is different in that a transistor that constitutes a pixel circuit 242 is implemented as a PMOS transistor.

In this case, compared with the driving timing diagrams of FIG. 7, the polarities of a scan signal Scan(n), a control signal GC(n) are inversed as applied, a first power ELVDD(t) is fixed (for example, 0V), and the voltage of a second power ELVSS is varied as time elapses to be in a form that is the inverse of the waveform of the first power ELVDD(t) of FIG. 7.

Consequently, compared with the embodiment of FIG. 6, in the embodiment of FIG. 9, a difference is that the transistor is implemented as a PMOS transistor and not as an NMOS transistor, but the driving operations and the principles thereof are similar, and thus, the detailed description thereof will be omitted.

Referring to FIG. 9, the pixel 240 in one embodiment of the present invention includes an OLED and a pixel circuit 242 that supplies a current to the OLED.

The cathode electrode of the OLED is coupled to the pixel circuit 242, and the anode electrode of the OLED is coupled to the first power ELVDD(t). The OLED generates light having a brightness (e.g., a predetermined brightness) corresponding to the current supplied by the pixel circuit 242.

However, in the embodiment of FIG. 9, the pixels 240 that constitute the display unit receive data signals supplied to data lines D1 to Dm when scan signals are supplied sequentially to scan lines S1 to Sn for a partial period (the aforementioned (c) step) of one frame, but the scan signals applied to the respective scan lines S1 to Sn, the second power ELVSS applied to the respective pixels 240, and control signals applied to respective control lines GC1 to GCn are collectively and simultaneously (or concurrently) applied to the respective pixels 240, the signals having voltage levels at respective levels (e.g., predetermined levels) for other periods ((a), (b), and (d) steps) of the one frame.

The pixel circuit in each of the pixels 240 includes three transistors PM1 to PM3 and one capacitor Cst in FIG. 9.

Here, the gate electrode of the first transistor PM1 is coupled to a scan line S, and the first electrode of the first transistor PM1 is coupled to a data line D. The second electrode of the first transistor PM1 is coupled to a first node N1.

In other words, the scan signal Scan(n) is applied to the gate electrode of the first transistor PM1, and the data signal Data (t) is applied to the first electrode of the first transistor PM1.

The gate electrode of the second transistor PM2 is coupled to the first node N1, and the first electrode of the second transistor PM2 is coupled to the cathode electrode of the organic light emitting diode. The second electrode of the second transistor PM2 is coupled to the second power ELVSS through the first and second electrodes of the third transistor PM3. The second transistor PM2 serves as a driving transistor.

In other words, the gate electrode of the third transistor PM3 is coupled to the control line GC, the first electrode of the third transistor PM3 is coupled to the second electrode of the second transistor PM2, and the second electrode of the third transistor PM3 is coupled to the second power ELVSS.

Therefore, the control signal GC(t) is applied to the gate electrode of the third transistor PM3, and the second power ELVSS that is varied to a predetermined level to be provided is applied to the second electrode thereof.

In addition, the anode electrode of the OLED is coupled to the first power ELVDD(t), and the capacitor Cst is coupled between the gate electrode of the second transistor PM2, that is, the first node N1, and the first electrode of the second transistor PM2, that is, the cathode electrode of the OLED.

In the embodiment of FIG. 9, all of the first to third transistors PM1 to PM3 are implemented as PMOS transistors.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display comprising:
   a display unit comprising a plurality of pixels arranged in a plurality of rows and columns coupled to scan lines, control lines, and data lines, wherein each of the pixels comprises an organic light emitting diode;
   a control line driver for providing control signals to the pixels through the control lines; and
   a power driver for applying a power, at different levels, to the pixels during a plurality of periods of one frame,
   wherein the power comprises a first power applied to the pixels,
   wherein each of the control signals is concurrently provided with each of the other control signals, at a turn-on level, directly to a switch electrically coupled between the first power and the organic light emitting diode in a corresponding one of the pixels,
   wherein the power is concurrently provided to each of the pixels,
   wherein the plurality of periods of one frame comprises a reset period, a threshold voltage sensing period, a scan period, an emission period, and an emission turn-off period,
   wherein the first power is applied at a low level during the reset period and the emission turn-off period,
   wherein the first power is applied at a high level during the threshold voltage sensing period and the emission period, and
   wherein the first power is applied at a level lower than the high level and higher than the low level during the scan period.

2. The organic light emitting display as claimed in claim 1, further comprising:
   a scan driver for supplying scan signals to the pixels through the scan lines;
   a data driver for supplying data signals to the pixels through the data lines; and
   a timing controller for controlling the control line driver, the power driver, the scan driver, and the data driver.

3. The organic light emitting display as claimed in claim 2, wherein the scan signals are applied sequentially to the scan lines for a partial period of the periods of one frame and are applied concurrently to the scan lines during the periods except for the partial period.

4. The organic light emitting display as claimed in claim 3, wherein widths of the sequentially applied scan signals are applied at two horizontal time, two adjacently applied ones of the scan signals being applied to be overlapped with each other by one horizontal time.

5. The organic light emitting display as claimed in claim 3, wherein the data signals are applied sequentially to the pixels scan line by scan line corresponding to the sequentially applied scan signals and are concurrently applied to all of the pixels through the data lines during the periods except for the partial period.

6. The organic light emitting display as claimed in claim 1, wherein each of the pixels further comprises:
   a first transistor having a gate electrode coupled to a scan line of the scan lines, a first electrode coupled to a data line of the data lines, and a second electrode coupled to a first node;
   a second transistor having a gate electrode coupled to the first node, a first electrode, and a second electrode;
   a third transistor having a gate electrode coupled to a control line of the control lines, a first electrode coupled to the second electrode of the second transistor, and a second electrode coupled to the first power; and
   a capacitor coupled between the gate electrode of the second transistor and the first electrode of the second transistor,
   wherein the organic light emitting diode has an anode electrode coupled to the first electrode of the second transistor and a cathode electrode coupled to a second power.

7. The organic light emitting display as claimed in claim 6, wherein the first to third transistors are NMOS transistors.

8. The organic light emitting display as claimed in claim 1, wherein the power comprises a first power and a second power, and the first power and the second power are applied to the pixels.

9. The organic light emitting display as claimed in claim 8, wherein each of the pixels further comprises:
   a first transistor having a gate electrode coupled to a scan line of the scan lines, a first electrode coupled to a data line of the data lines, and a second electrode coupled to a first node;
   a second transistor having a gate electrode coupled to the first node, a first electrode, and a second electrode;
   a third transistor having a gate electrode coupled to a control line of the control lines, a first electrode coupled to the first electrode of the second transistor, and a second electrode coupled to the second power; and
   a capacitor coupled between the gate electrode of the second transistor and the first electrode of the second transistor,
   wherein the organic light emitting diode has a cathode electrode coupled to the first electrode of the second transistor and an anode electrode coupled to the first power.

10. The organic light emitting display as claimed in claim 9, wherein the first to third transistors are PMOS transistors.

11. The organic light emitting display as claimed in claim 1 wherein a voltage of the power varies after each of plurality of periods of one frame.

12. A driving method of an organic light emitting display, the method comprising:
   (a) resetting data voltages applied to a plurality of pixels by concurrently applying a first power at a low level and scan signals, control signals, and data signals having voltage values at respective levels, to all of the pixels that constitute a display unit, wherein each of the pixels comprises an organic light emitting diode;
   (b) storing a threshold voltage of a driving transistor included in the respective pixels by concurrently applying the first power at a high level, the scan signals, the control signals, and the data signals, having the voltage values at respective levels, to all of the pixels;
   (c) applying the scan signals sequentially to the pixels coupled to scan lines of the display unit and applying the data signals to the pixels scan line by scan line corresponding to the sequentially applied scan signals, and concurrently applying the first power at a level lower than the high level and higher than the low level;

(d) light-emitting all of the pixels, concurrently, at brightnesses corresponding to the data voltages stored in the pixels by concurrently applying the first power at a high level, the scan signals at a logic low level, the control signals at a logic high level, and the data signals, having the voltage values at respective levels, to all of the pixels; and (e) turning off emission of the pixels by concurrently applying the first power at the low level and a second power, the control signals, and the data signals having the voltage values at respective levels, to all of the pixels and thus lowering a voltage of an anode electrode of the organic light emitting diode included in the respective pixels, wherein each of the control signals is concurrently provided with each of the other control signals, at a turn-on level, directly to a transistor electrically coupled between the first power and the organic light emitting diode in a corresponding one of the pixels.

13. The driving method of the organic light emitting display as claimed in claim 12, wherein one frame is implemented through (a) to (e).

14. The driving method of the organic light emitting display as claimed in claim 12, wherein the one frame is a progressively progressed frame and comprises an $n^{th}$ frame for displaying a left-eye image and an $n+1^{st}$ frame for displaying a right-eye image.

15. The driving method of the organic light emitting display as claimed in 14, wherein an entire time between an emission period of the $n^{th}$ frame and an emission period of the $n+1^{st}$ frame is synchronized with a response time of a pair of shutter glasses.

16. The driving method of the organic light emitting display as claimed in claim 12, wherein each of the pixels comprises:
    a first NMOS transistor having a gate electrode coupled to a scan line, a first electrode coupled to a data line, and a second electrode coupled to a first node;
    a second NMOS transistor having a gate electrode coupled to the first node, a first electrode, and a second electrode;
    a third NMOS transistor having a gate electrode coupled to a control line, a first electrode coupled to the first electrode of the second NMOS transistor, and a second electrode coupled to the first power; and
    a capacitor coupled between the gate electrode of the second NMOS transistor and the first electrode of the second NMOS transistor,
    wherein the organic light emitting diode having an anode electrode coupled to the first electrode of the second NMOS transistor and a cathode electrode coupled to a second power.

17. The driving method of the organic light emitting display as claimed in claim 16, wherein, in (a), the first power is applied at a low level, the scan signal is applied at a high level, and the control signal is applied at a high level.

18. The driving method of the organic light emitting display as claimed in claim 16, wherein, in (b), the first power is applied at a high level, and the scan signal and the control signal are applied at a high level, respectively.

19. The driving method of the organic light emitting display as claimed in claim 16, wherein, in (c), the control signal is applied at a low level.

20. The driving method of the organic light emitting display as claimed in claim 16, wherein, in (c), widths of the sequentially applied scan signals are applied at two horizontal time, adjacently applied ones of the scan signals being applied to be overlapped with each other by one horizontal time.

21. The driving method of the organic light emitting display as claimed in claim 12 wherein the voltage value of the first power varies after each of plurality of periods of one frame.

22. An organic light emitting display comprising:
    a display unit comprising a plurality of pixels arranged in a plurality of rows and columns coupled to scan lines, control lines, and data lines, wherein each of the pixels comprises an organic light emitting diode; a control line driver for providing control signals to the pixels through the control lines; and a power driver for applying a power at different levels to the pixels during a plurality of periods of one frame,
    wherein the power comprises a first power applied to the pixels,
    wherein each of the control signals is concurrently provided with each of the other control signals directly to a switch electrically coupled between the first power and the organic light emitting diode in a corresponding one of the pixels so that all of the pixels emit light and stop emitting light at a same time,
    wherein the power is concurrently provided to each of the pixels,
    wherein the plurality of periods of one frame comprises a reset period, a threshold voltage sensing period, a scan period, an emission period, and an emission turn-off period,
    wherein the first power is applied at a low level during the reset period and the emission turn-off period,
    wherein the first power is applied at a high level during the threshold voltage sensing period and the emission period, and
    wherein the first power is applied at a level lower than the high level and higher than the low level during the scan period.

* * * * *